(12) United States Patent
Karhu (10) Patent No.: US 6,535,461 B1
(45) Date of Patent: Mar. 18, 2003

(54) COMMUNICATION DEVICE (75) Inventor: Jukka-Matti Karhu, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/577,672

(22) Filed: May 25, 2000

(30) Foreign Application Priority Data

May 26, 1999 (GB) .............................. 9912299

(51) Int. Cl.[7] .................. G04B 47/00; G04B 47/02; H04M 1/00; H04B 1/38
(52) U.S. Cl. ................. 368/10; 368/13; 379/430; 379/433.01; 455/575
(58) Field of Search ............... 368/10, 13, 69, 368/47, 294, 295; 379/90, 428, 430, 433; 455/90, 56, 575, 334, 344

(56) References Cited

U.S. PATENT DOCUMENTS

| 4,109,457 A | 8/1978 | Laesser et al. |
| 4,130,738 A | 12/1978 | Sandstedt ................. 179/90 |
| 4,244,044 A | 1/1981 | Olsson |
| 5,444,671 A | 8/1995 | Tschannen et al. |
| 5,508,978 A | 4/1996 | Kalbermatter et al. |
| 5,715,311 A | 2/1998 | Sudo et al. |
| 5,754,645 A | 5/1998 | Metroka et al. |

FOREIGN PATENT DOCUMENTS

| EP | 0198576 | 10/1986 | |
| EP | 0602828 | 6/1994 | ............ H04M/1/20 |
| EP | 0782274 | 7/1997 | ............ H04B/1/08 |
| EP | 0840465 | 5/1998 | ............ H04B/1/38 |
| GB | 1391637 | 4/1975 | |

Primary Examiner—Vit Miska
(74) Attorney, Agent, or Firm—Antonelli, Terry, Stout & Kraus, LLP (57) ABSTRACT A radio communication device is presented. The device is operated by user input means. The user input means comprise a circular ring which surrounds a display. The ring is mounted for rotational movement and by movement of the ring the functions of the communication device are controlled and information is entered. The communication device is preferably a wrist watch phone or a wrist phone 8 Claims, 8 Drawing Sheets

COMMUNICATION DEVICE

BACKGROUND OF THE INVENTION

The present invention is generally related to a communication device, especially to a communication device which has small dimensions and may be sized for attachment to a wrist.

Today communication devices, e.g. mobile phones working in cellular networks for enabling phone calls comprise a numerical keypad with twelve keys to enter phone numbers and characters and some special keys for controlling the phone functions. For operating the keys the user can hold the communication device comfortably in one hand and operates the key with his fingers.

A display, which is usually placed above the keypad on the front side of the communication device displays information, which is related to the input by the user or to the state of the communication device. For example if the user enters a phone number by using the numerical keypad the number is displayed on the display. Furthermore the user can scroll through a stored phonebook by using the up and down keys and he can select one of the names, which are shown on the display. On activation of a call key a phone call to the selected person is established by using the telephone number which is associated to this name in the memory of the device. This kind of user interface is for example used by the Nokia 3110 mobile phone which is designed for use in the cellular telephone system GSM (Global System for Mobile Communications).

As the user is interested to have mobile phones with small dimensions the user interface has to be adapted to this small dimensions. For this reason the telephone could be divided in two parts as the same applicant describes it in the pending patent application EP 840465. A first part comprises at least a power supply, a radio part (transceiver) to communicate within the radio telephone system, e.g. with a base station or another radio phone, an antenna and data transfer means for communicating with the second part. The second part comprises at least keys and data transfer means for communicating with the first part. As described in the mentioned patent application the second part can be carried on the wrist of the user like a wristwatch.

As it can be noticed very easily by looking at the drawings of the mentioned documents it is very difficult to operate the keys of said wrist phones because the dimensions of the keys are very small. Especially the numerical keyboard, as it is disclosed in EP 0602828 A1, comprises very small keys, which can be operated only with fingernails or by the usage of a special stick or the tip of a pen. Also if the phone has the dimensions of a pocket watch the dimensions of the keys of a numerical keypad are to small for comfortable operation.

Even if the user interface is designed in a way that only a few keys are necessary for operation they are usually difficult to operate. Furthermore the functionality of the User Interface has usually to be reduced if only a low number of keys is available.

Therefore it is an object of the invention to improve the data entry into a phone with small dimensions like a wrist phone.

SUMMARY OF THE INVENTION

In accordance with the invention a radio communication device, sized for attachment to a wrist, comprises transceiver means for transmitting and receiving radio signals comprising data, a display for displaying data, processor means including a memory for controlling the transceiver means and the display and user input means, connected to the processor means. The user input means comprise a substantially circular ring surrounding the display. The ring is mounted for rotational movement about an axis passing substantially through the centre of the ring and substantially perpendicular to the plane of the ring wherein the processor means is responsive to the movement of the means to control the transceiver and the display.

The radio communication device is e.g. a mobile radiotelephone, a pager or a cordless telephone.

The radio communication device may represent the user interface of a mobile radiotelephone. In this case the user interface itself only contains a short range radio transceiver and communication to the cellular network is done through a kind of booster which is equipped with a short range radio interface for communication with the user interface and a cellular phone transceiver for communication with the cellular telephone network.

Embodiments of the present invention provide considerable advantages over solutions of prior art. The communication device may have the shape of a wristwatch or a pocket watch with a cylindrical shape. A ring in the shape of a bezel, as it is for example know from diving watches for controlling the diving time, can be used as an input device.

In a further advantageous embodiment of the invention the circular ring of the communication device is mounted for translational displacement of the ring parallel to the plane of the ring. Shifting the ring in any direction can enter this way data, which is selected by rotation of the ring. Different shifting directions could lead to different actions. The ring may be shifted to four directions (left, right, up,down) to control four different actions. The ring may be shifted in any direction and only one operation is triggered this way.

Furthermore the circular ring of the communication device is mounted for translational displacement of the ring perpendicular to the plane of the ring. This way data, which is selected by the rotation of the ring, can be entered by pressing down the ring. Any other functions/actions can also be initiated by pressing down the ring.

In a further advantageous embodiment the communication device comprises means for detecting clockwise and anti-clockwise rotation of the ring. The detection of the rotation direction is for example important while the user is selecting characters from the alphabet. For example the user does not need to rotate the ring for a lot of steps in clockwise direction if he wants to choose the letter "A" when the actually selected letter is a "B" . If the device detects the anti-clockwise rotation the user only needs to rotate the ring for one step anti-clockwise.

By rotational movement of the ring alphanumeric data can be selected from the memory which is then displayed on the display. This kind of data can represent a telephone number, which is entered by a user for establishing a phone call to a telephone.

The data selected by the rotation of the ring can also be a name which is associated with a telephone number in the phone book memory of the communication device. While rotating the ring the user scrolls through the phonebook of the communication device and selects a name, and thereby the phone number by shifting or pressing the ring.

This data could also be a e.g. short message, which is entered and/or edited by the user input means. The entered short message can be send to a recipient by the radio communication device then.

The rotational movement of the input ring can advantageously be detected by electro-optical conversion means. The electro-optical conversion means can be, for example, an infra red light emitting diode (IR-LED) and an infrared detector. The ring contains at its underside light reflecting and non-light reflecting areas and while rotation of the ring the IR detector detects changes from the reflecting to non-reflecting area. These changes are indicated to the processing means.

The translational displacement of the ring e.g. shifting the ring or pressing down the ring is advantageously indicated to the microprocessor by key buttons. Key buttons on the inner side of the ring indicates to the processing means that the ring is shifted and key buttons below the ring indicate to the processing means that the ring is pressed down.

The present invention will now be described by way of example, with reference to the accompanying drawings, in which:

DETAILED DESCRIPTION

Figure 1:
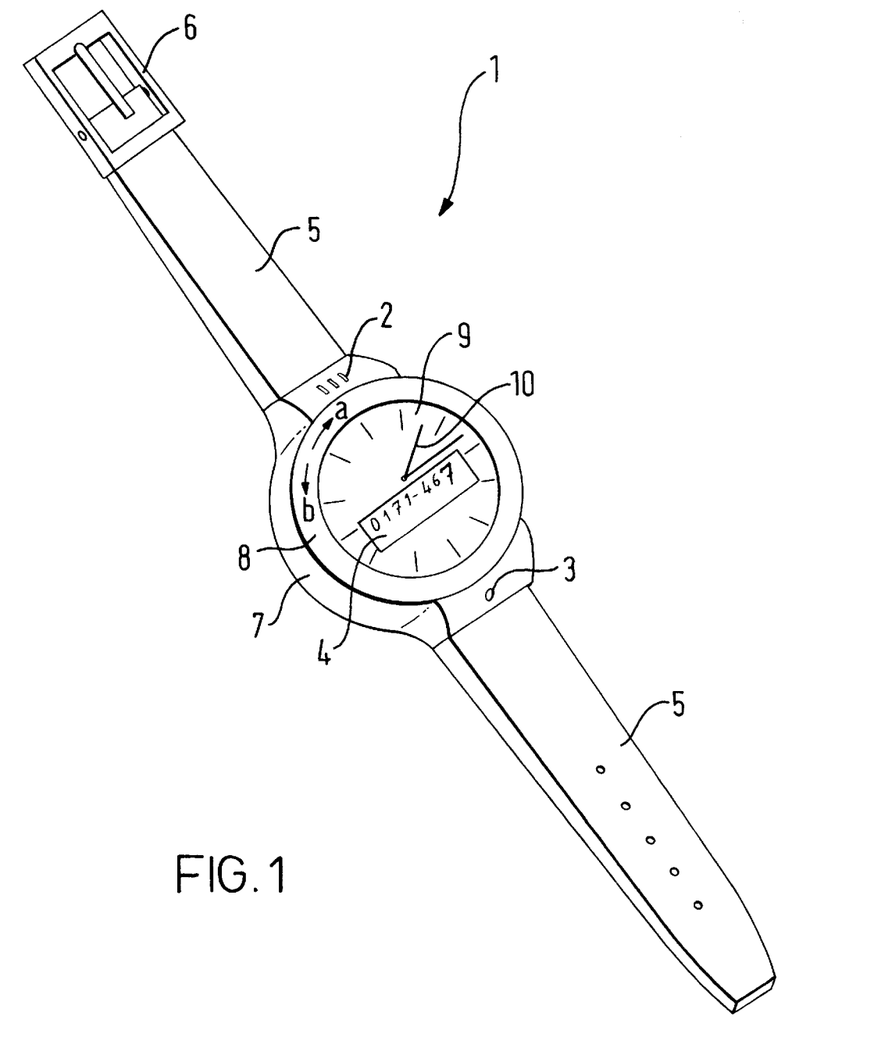
FIG. 1 is a perspective view of a wrist telephone according to the invention

FIG. 1 discloses a radio communication device 1 in accordance to the invention. The device is built in the shape of a wristwatch and may contain the components of a wristwatch for displaying time of day. The following description does not refer to the watch functionality as long at is not related to the functions of the radio communication device 1. The radio communication device is referred to as a wrist watch phone 1 in the following. The wrist watch phone 1 according to the invention comprises a housing 7, a first and a second strap 5 with a closing mechanism 6 for attaching the wrist watch phone 1 to the wrist of a user. For enabling the watch functionality the wristwatch phone may further comprise a clock face 9 and two watch hands 10 for presenting the time of day.

For enabling the phone functionality the wristwatch phone 1 further comprises an opening 3 for a microphone and openings for a loudspeaker 2. The microphone and loudspeaker itself are placed within the housing 7 below the respective openings. For operating the wristwatch phone 1 a display 4 is placed within the clock face. The display in FIG. 1 actually presents an incomplete telephone number, which is for example just entered by a user. For entering the phone number the user operates the ring 8 which can be rotated in the directions a (clockwise) and b (anti-clockwise) as they are represented by the arrows on the ring 8. The arrows are only shown in this drawing to explain the functions. The ring 8 is mounted for rotational movement about an axis passing substantially through the centre of the ring and perpendicular to the plane of the ring.

As it can be seen the last digit "7" of the incomplete phone number "0171-467" is enlarged on the display. This is to show to the user that he just enters this digit of the phone number. The user can now rotate input ring 8 to direction "a" to change the last digit of the phone number to "8". If the ring is rotated to direction "b" the last digit of the phone number is changed from "7" to "6". Generally speaking, rotation to directions, "a" increases the number and rotation to "b" decreases the phone number. Except are changes from "0" to "9" and "9" to "0". There are different possibilities to change to the next digit of the phone number, which will be presented with reference to other drawings later on.

The entered telephone number may be selected by pressing down the input ring 8, by shifting the input ring or pressing any other selection key which is placed on the housing 7 of the wrist phone. The mechanism to detect when the ring is pressed down or shifted is explained with reference to the drawings FIG. 7, FIG. 12 and FIG. 13 later on.

Figure 15:
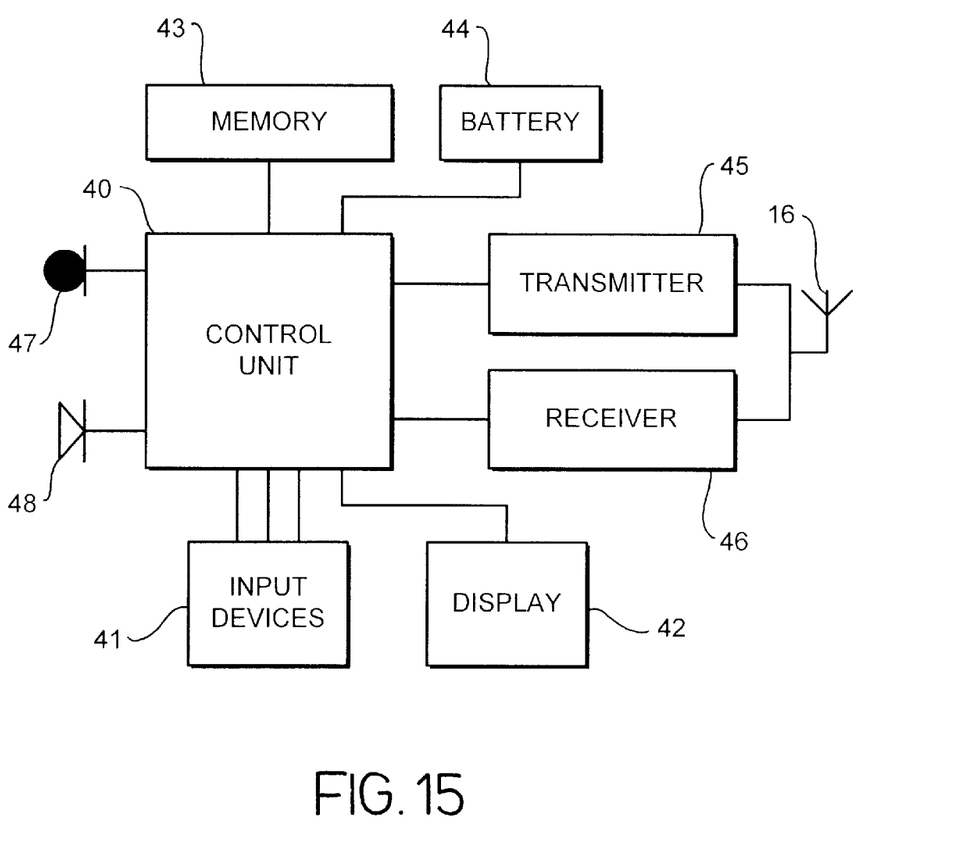
FIG. 15 is a block diagram of circuitry used in the inventive radio communication device

A block diagram of the wrist watch phone 1 is depicted in FIG. 15. The wrist watch phone 1 basically includes a microprocessor (control unit) 40 which is connected to various input devices 41. One of the input devices according to the invention is the input ring 8.

For displaying e.g. dialled phone numbers, menu items or received short messages the microprocessor is further connected to a display 42.

The microprocessor 40 is further connected to a microphone 47 and a loudspeaker 48 for enabling voice communication. A radio frequency transmitter 46 and a radio frequency receiver 45 together form a transceiver for transmitting and receiving radio signal, which comprise data. Such data can be voice signals or data messages. An antenna 16 is also part of the wristwatch phone.

For powering the electrical components of the wrist watch phone a battery 44 is included.

The memory 43 mainly contains data, which is necessary for operating the telephone. The memory might also contain a phonebook, which is entered by the user of the phone. The phonebook contains telephone numbers and accompanying names. When the name and telephone numbers are entered into the phonebook the user can easily select the name of the person he desires to call by scrolling through the phonebook in the memory. Scrolling through the phonebook is advantageously done by rotating the input ring 8.

The microprocessor 40 is connected to the input devices 41 and responsive to the input made by the input devices to control the receiver 46, the transmitter 45 and the display 42.

The transmitter 45 and receiver 46 together with antenna 14 can be built in a way to connect the wrist watch phone through radio waves directly to a cellular phone network as it is for example known as GSM (Global System for Mobile communication).

Figure 2:
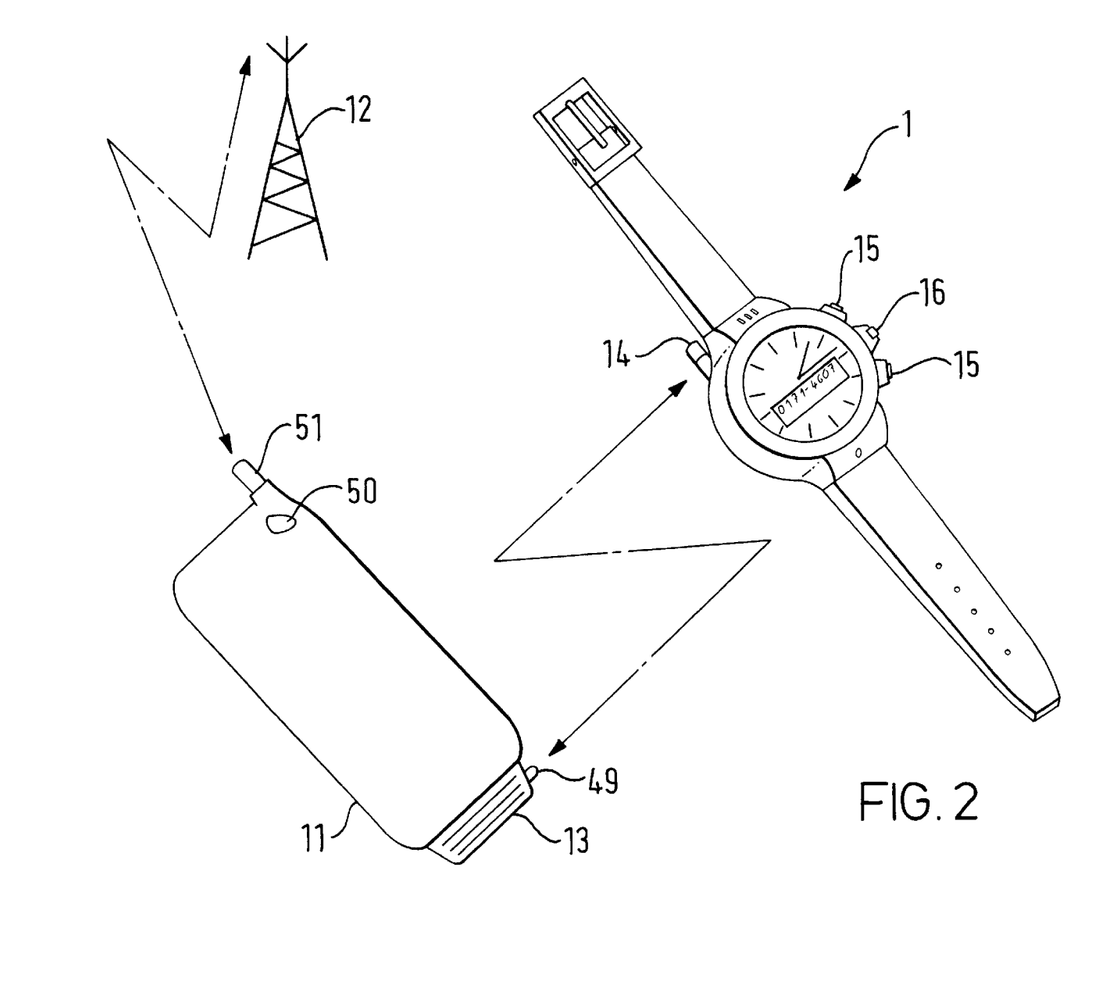
FIG. 2 is a perspective view of a radio communication device according to the invention, which is used as a user interface for a mobile radiotelephone with the mobile radiotelephone used in a cellular network

The heat dissipation of the transmitter 45 might make it worthwhile to connect the wrist watch phone 1 through a short range radio link to a kind of booster 11 first, as it 10 is shown in FIG. 2. The booster enables the cellular radio communication through antenna 51 with the cellular network, which is represented by base station 12. The booster 11 is equipped with a short-range radio interface 13 and transmits and receives data from and to the wristwatch phone through antenna 46. The booster 11 can be turned on and off by operating key button 50.

The short-range radio interface can be for example a low power radio frequency link as it is for example developed by the so-called "Bluetooth" consortium. Transmitters according to the Bluetooth standard transmit with a much lower RF energy compared to cellular phone transceiver and this way heat dissipation of the transmitter 45 of the wrist watch phone 1 is drastically reduced.

In FIG. 2 furthermore a button 16, for setting the wrist watch time, and two control button 15 are presented at the wrist watch-phone 1. The control buttons 15 can be used for controlling watch and phone functions, as it will be explained later on.

Figure 3:
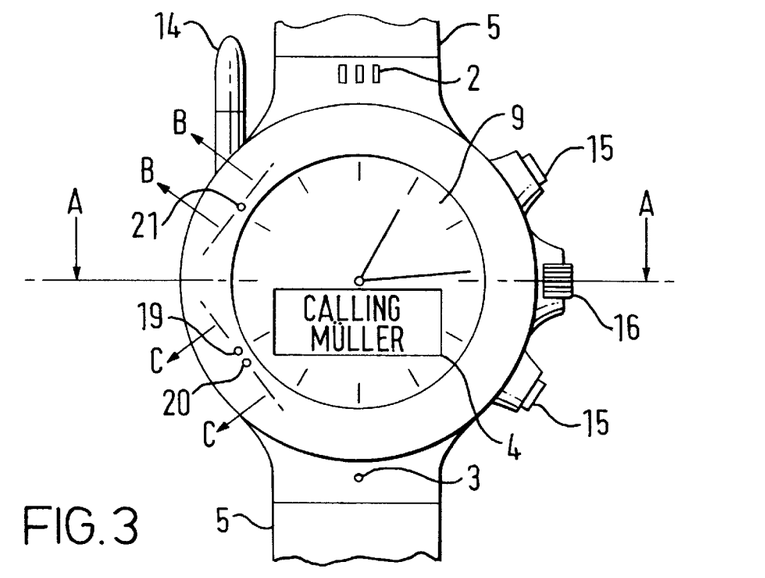
FIG. 3 is a front view of a first embodiment of a radio communication device according to the invention
Figure 4:
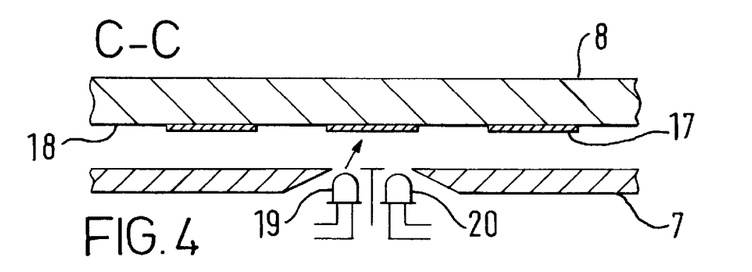
FIG. 4 is a section view (c—c) of the device of FIG. 3 showing details of the infrared detection means
Figure 5:
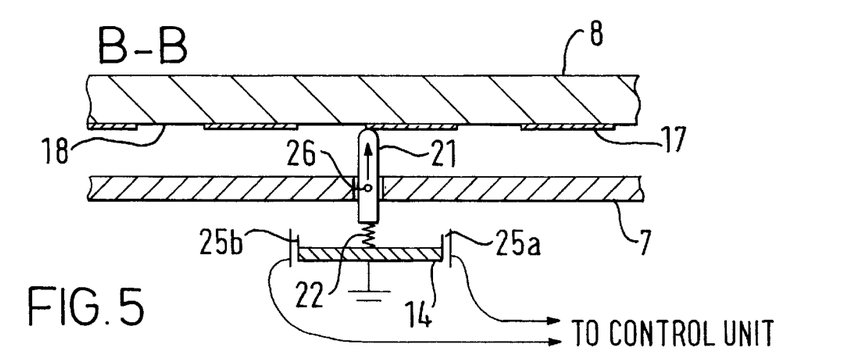
FIG. 5 is a first section view b—b of the device of FIG. 3 showing details of a rotation direction sensor when the input ring is not operated.
Figure 9:
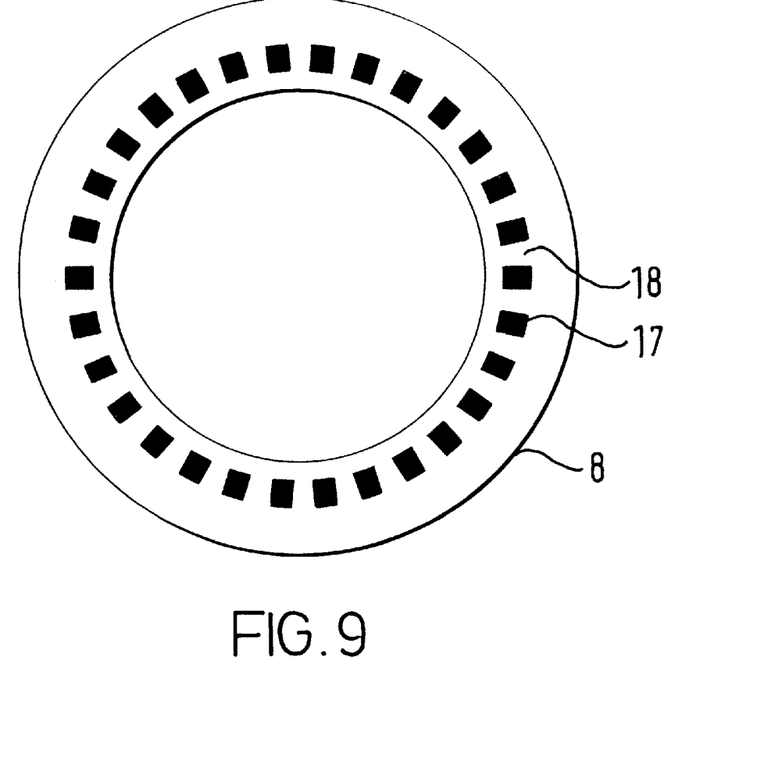
FIG. 9 is a back view of the input ring

FIG. 3, which can be understood in combination with FIG. 4, 5 and 9, shows a front view of the wrist watch phone 1. The input ring 8 is removed from the wristwatch phone 1. The rear-side of the input ring 8 of the wrist watch phone 1 is shown in FIG. 9. The input ring 8 has at its rear surface sections 18. The sections 18 reflect light, especially infrared (IR) light and the sections 17 are unable to reflect infrared light. The sections 17 can be for example painted black or the surface is scratched in order to disperse light. Below input ring 8, on the left lower corner of the wristwatch phone in FIG. 3, an infrared light emitting diode 19 and an IR light receiving diode 20 are placed. FIG. 4 shows the section view c—c of FIG. 3 with the input ring mounted on the wristwatch phone 1. As it can be seen in the section view c—c of FIG. 4, IR light transmitted by the diode 19 is not reflected while a not reflecting section 17 is above the IR diode 19 and the IR receiver 20. The IR diode 20 is coupled to the microprocessor 40.

Each time the IR receiver 20 receives IR light it sends a logical "1/high signal" to the microprocessor 40 and each time the IR receiver 20 does not receive IR light it sends a logical "0/low signal" to the microprocessor 40. While the user rotates the input ring the microprocessor 40 recognises changes of the logical signals. If the user enters for example a telephone, number as explained with reference to FIG. 1, the microprocessor changes a digit of the number, which is displayed, on display 4 in response to each level change. Without recognition of the rotation direction the microprocessor might only change the number to higher values. If the digit "4" is displayed but the digit "3" should be selected the user has to rotate the input ring 8 in any direction until the microprocessor has recognised nine signal level changes from IR receiver 20 and the digit "3" is displayed.

An arrangement to recognise also the rotation direction of input ring 8 is presented in FIG. 5. FIG. 5 shows the section view b—b of FIG. 3. In FIG. 5 the input ring 8 is shown in its mounted position. A pin 21 is pressed by the force of the spring 22 against the rear surface of the input ring 8.

The pin 21 projects substantially half out of the housing 7 and projects half into the housing. The pin 21 can furthermore cant over to the left and right side around the virtual axis 26. The spring 22 is mounted on a metal plate 14, which is connected to electrical ground. The metal plate can be shifted to the left and right side and responsive to the shifting direction the switch 25*a* or the switch 25*b* is closed.

Figure 6:
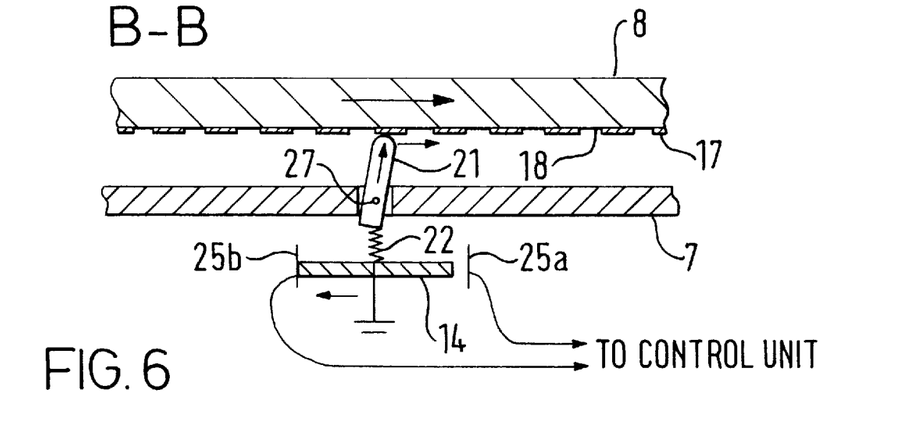
FIG. 6 is a second section view b—b of the device of FIG. 3 showing details of a rotation direction sensor when the input ring is operated.

An example when the ring is rotated anticlockwise is shown in FIG. 6. The arrow within input ring 8 in FIG. 6 represents the rotation direction. The upper tip of the pin 21 is pressed against the input ring and by the friction between the input ring 8 and the tip of pin 21, the tip of the pin is canted over to the right side. Due to the virtual axis 27 the lower part within the housing 7 is canted over to the left side now and this way the spring and thereby the metal plate 14 is shifted to the left side. Now the contact plates of switch 25*b* are connected to each other. The switch 25*b* is connected to the microprocessor 40 which now recognises that the input ring is rotated anti-clockwise. In combination with the information obtained from the IR detector the microprocessor decrease the number on the display when also the IR detector senses a level change.

If the non-reflecting sections 17 on the backside of the input ring 8 are also projecting from the surface of the input ring 8 the pin 21 clicks on each change from section 117 to section 18 and on each change from section 18 to 17. This gives the user a feeling when a change of a digit takes place.

Figure 7:
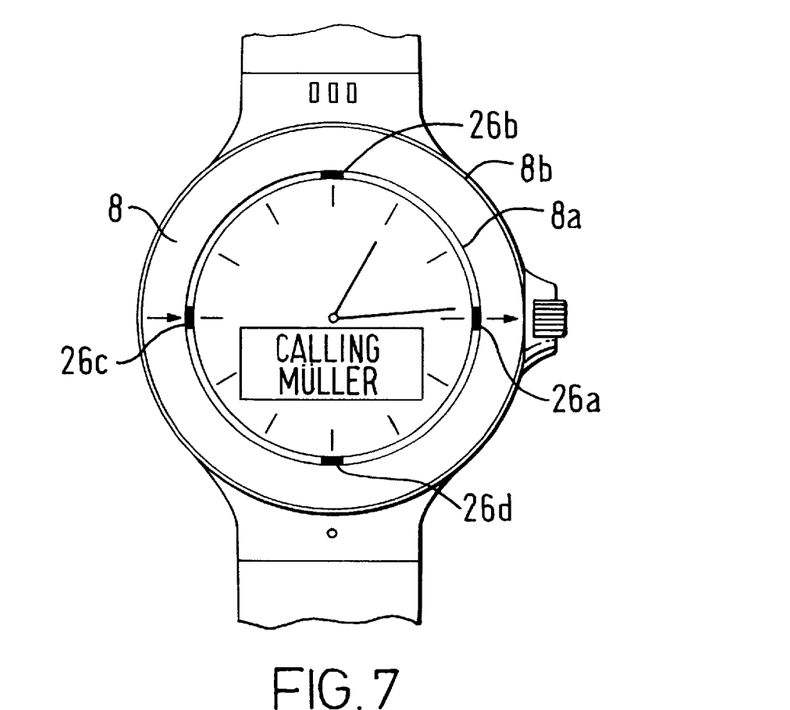
FIG. 7 is a front view of a second embodiment of a radio communication device according to the invention

In FIG. 7 another advantageous embodiment of the wrist watch phone 1 is shown. The input ring 8 can be used as described before but additionally the input ring 8 can be translational displaced parallel to the plane of the ring. The translational displacement is sensed by key buttons 26*a* to 26*d* which are connected to the microprocessor 40. In the preceding example to enter a phone number by rotating ring 8 the entered digit of a telephone number can for example be selected by shifting the input ring to the left as presented by the arrows on the ring. By shifting the ring 8 to the left, key button 26*c* is operate and the microprocessor is informed that the last digit of the phone number is selected now. The next digit can be entered by rotating the ring 8 again. Shifting the ring 8 to the left can for example be the signal for the microprocessor 40 that the number, which was entered so far, should be corrected and jumps back to the previous digit in the phone number when switch 26*a* is closed. Shifting the ring 8 to the to (i.e. closing key button 26*d*) can be the sign for the microprocessor 40 that the complete phone number is entered and can be dialled now. Shifting the ring 8 to the bottom, (i.e. closing key button 26*b*) can be the sign for the microprocessor to cancel the whole procedure.

The key buttons 26*a* to 26*d* are located between the inner circle 8*a* of the input ring 8 and the bezel 28, which covers the clock face. They can also be hidden below the input ring 8, which is not shown here.

The input ring 8 may be shifted in four direction (up, down, left, right) to control four different operations but it could also be possible to detect if two of the key buttons 26*a* to 26*d* are closed. If the ring 8 is for example shifted to the top and to the right the key buttons 26*c* and 26*d* are closed. This way eight different operations can be selected. Furthermore it may be possible to shift the ring in any direction and only one operation is performed when the ring is shifted in any direction.

Figure 8:
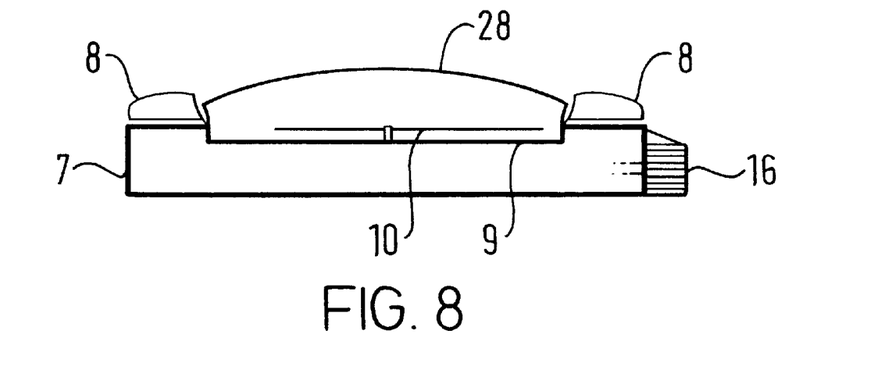
FIG. 8 is a section view a—a of the device of FIG. 3
Figure 13:
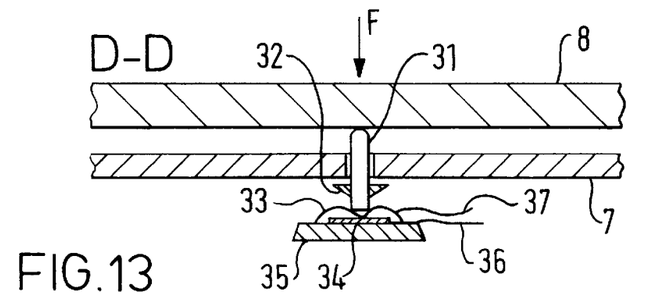
FIG. 13 is a second section view d—d of a radio communication device of FIG. 10

FIG. 8 shows the section view a—a of FIG. 13. This section view shows the input ring 8, which is mounted, between the-housing 7 and the bezel 28. For assembling the wrist watch phone 1 the input ring 8 is first laid on the phone 8 and then the bezel 28 is mounted on the housing 7 in a manner it is known to persons skilled in the art. If the input ring is mounted as shown in FIG. 8 no additional device is necessary to keep it in its position.

Figure 10:
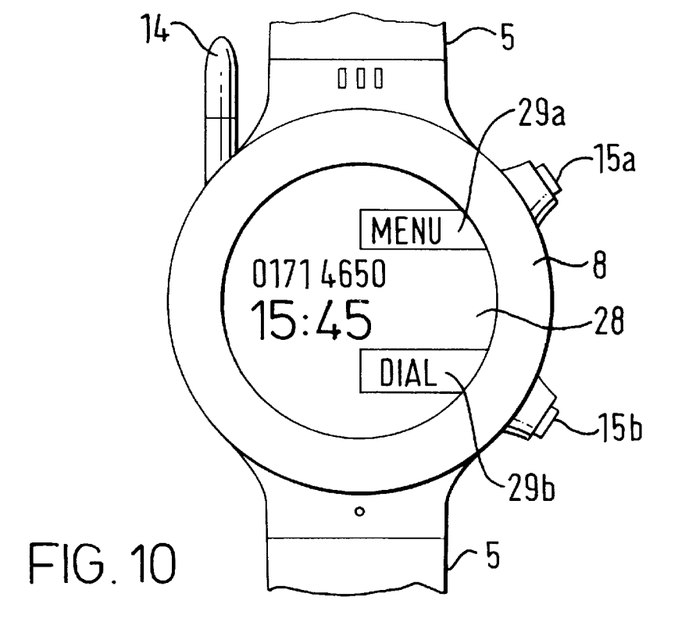
FIG. 10 is a front view of a third embodiment of a radio communication device according to the invention

In FIG. 10 another alternative embodiment of the inventive concept is disclosed. The input ring 8 can be used as described in the foregoing description, i.e. it can be rotated clockwise and anti-clockwise for operating the wrist watch phone 1. The key buttons 15a and 15b are used as a tactile user interface for the wrist watch phone 1. The clock face 28 is completely occupied by electronic display, e.g. a full graphical LCD display.

Full graphical LCD displays are known from mobile phones today. The Nokia mobile phone of the 6100 series might be taken as one example. Full graphical display means that teach pixel of the display can be controlled by the microprocessor 40. It is possible to display any kind of information on any place of the display. In this example the time of day (15:45) is displayed on the left side of display 28 and a telephone number (01714650) which just might be selected by the user is displayed above the time of day.

Furthermore the functions which can be actually selected by the user with the key buttons 15a and 15b are displayed on the right side on the display within the display areas 29a and 29b. The function "MENU", as it is displayed in field 29a, can be selected by pressing button key 15a and the function "DIAL", as it is displayed in field 29b can actually be selected by pressing key button 15b. Each time the key buttons 15a and 15b are operated the functions, which can be selected by pressing the keys, will change and the new available function is displayed in the field near to the key. This concept to change the functions of a key is also known from present mobile phones like the Nokia 6100 series.

Figure 11:
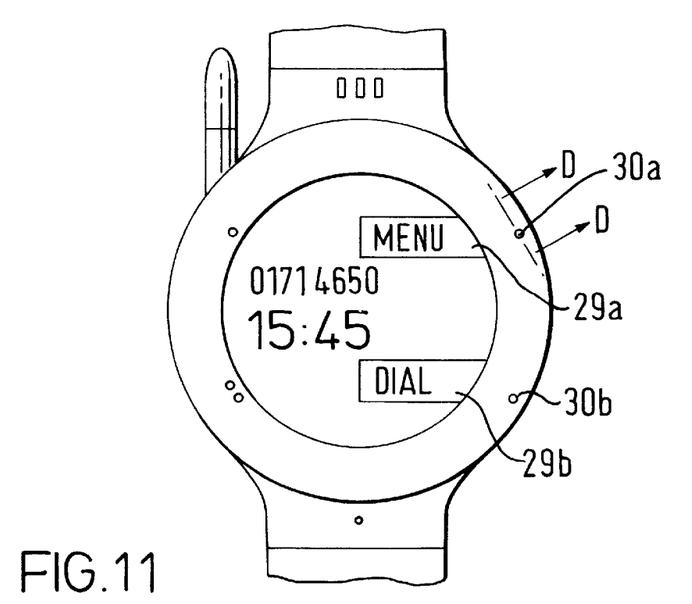
FIG. 11 is a front view of a fourth embodiment of a radio communication device according to the invention

FIG. 11 presents a similar concept as explained with reference to FIG. 10, but the key buttons 15a and 15b are removed and instead key buttons 30a and 30b are placed below input ring 8 within the housing 7. The section view d—d of key buttons 30a is shown in FIG. 12 and FIG. 13.

Below the input ring 8 a pin 31 with a stop element 32 is arranged. By the force of a metal spring 33 the pin 31 is pressed out of the housing 7 until the stop elements 32 avoid further jut out. Below the metal spring a contact plate 34 on a support member 35, e.g. a printed circuit board, is arranged. The metal spring 33 and the contact plate 34 are connected to the microprocessor 40 by the contact lines 36 and 37.

When the user of the wrist watch phone 1 presses down the input ring 8, which is demonstrated by arrow F in FIG. 13, the pin 31 bends the spring 37 until the spring 37 comes into contact with the metal plate 34. The microprocessor now recognises that the/user pressed down the input ring 8 and wants to select thereby the function which was presented on display field 29a.

Figure 12:
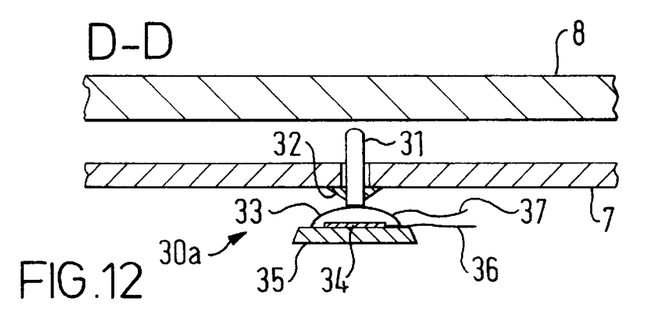
FIG. 12 is a first section view d—d of a radio communication device of FIG. 10

In order to enable the function as presented with reference to FIGS. 11, 12 and 13 the input ring 8 might need to be pushed up by the force of springs which are not shown in the drawings. The pins 31 can also be constructed in a way to push up the input ring 8 as long as it is not operated.

In another embodiment the input ring 8 may also be pulled for triggering any operations instead of pushing it.

Figure 14:
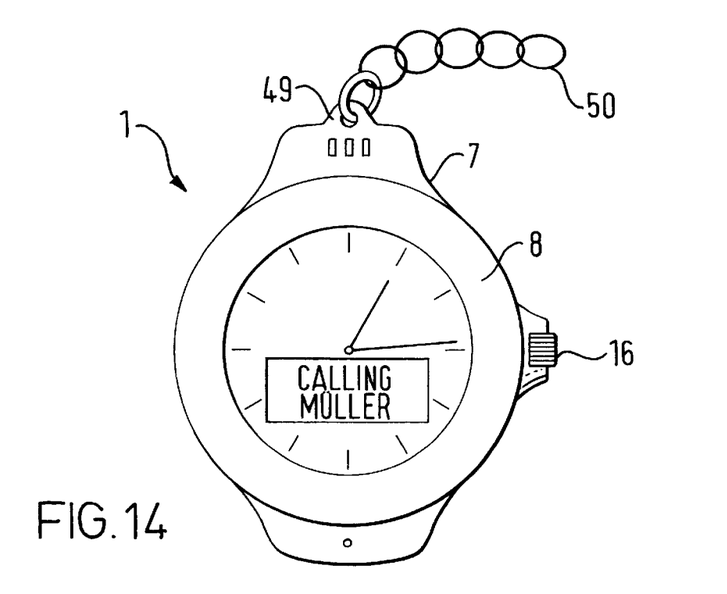
FIG. 14. is a front view of a fourth embodiment of a radio communication device according to the invention

FIG. 14 shows the wristwatch phone 1 in the form of a pocket watch. Instead of straps 5 and a locking mechanism 6 it comprises an eyelet 49 for keeping a watch chain 50. All other functions as presented in the foregoing description are also used by this pocket watch.

The drawings show various embodiments of the invention comprising an antenna 14 outside the housing 7. This antenna might also be placed within the housing 7 or within the wrist straps 5. Therefore the antenna is not shown in all drawings.

The present invention may include any novel feature or combination of features disclosed herein either explicitly or implicitly or any generalisation thereof irrespective of whether or not it relates to the presently claimed invention or mitigates any or all of the problems addressed. In view of the foregoing description it will be evident to a person skilled in the art that various modifications may be made within the scope of invention.

What is claimed is:

1. A radio communication device, sized for attachment to a wrist, comprising:
   a transceiver means for transmitting and receiving radio signals comprising data,
   a display for displaying data,
   processor means including a memory for controlling the transceiver means and the display
   user input means, connected to the processor means, comprising a substantially circular ring surrounding the display and mounted for rotational movement about an axis passing substantially through the center of the ring and substantially perpendicular to the plane of the ring,
      wherein the processor means is responsive to movement of the ring to control the transceiver and the display and
      wherein the circular ring is mounted for translational displacement of the ring. parallel to the plane of the ring.

2. A communication device according to claim 1 wherein the translational displacement of the ring is converted to electrical signals by push buttons.

3. A radio communication device, sized for attachment to a wrist, comprising:
   a transceiver means for transmitting and receiving radio signals comprising data,
   a display for displaying data,
   processor means including a memory for controlling the transceiver means and the display
   user input means, connected to the processor means, comprising a substantially circular ring surrounding the display and mounted for rotational movement about an axis passing substantially through the center of the ring and substantially perpendicular to the plane of the ring,
      wherein the processor means is responsive to movement of the ring to control the transceiver and the display and
   comprising means for detecting clockwise and anti-clockwise rotation of the circular ring.

4. A radio communication device, sized for attachment to a wrist, comprising:
   a transceiver means for transmitting and receiving radio signals comprising data,
   a display for displaying data,
   processor means including a memory for controlling the transceiver means and the display
   user input means, connected to the processor means, comprising a substantially circular ring surrounding the display and mounted for rotational movement about an axis passing substantially through the center of the ring and substantially perpendicular to the plane of the ring,
      wherein the processor means is responsive to movement of the ring to control the transceiver and the display and whereby the electro-optical conversion means are an infrared diode and an infrared detector place below the ring and the ring comprises light reflecting and non-light reflecting regions at its backside.

5. A radio communication device, sized for attachment to a wrist, comprising:

a transceiver means for transmitting and receiving radio signals comprising data, a display for displaying data, processor means including a memory for controlling the transceiver means and the display user input means, connected to the processor means, comprising a substantially circular ring surrounding the display and mounted for rotational movement about an axis passing substantially through the center of the ring and substantially perpendicular to the plane of the ring, wherein the processor means is responsive to movement of the ring to control the transceiver and the display and wherein the circular ring is mounted for translational displacement of the ring parallel to the plane of the ring.

6. A communication device according to claim 5 wherein the translational displacement of the ring is converted to electrical signals by push buttons.

7. A radio communication device, sized for attachment to a wrist, comprising:

a transceiver means for transmitting and receiving radio signals comprising data, a display for displaying data, processor means including a memory for controlling the transceiver means and the display user input means, connected to the processor means, comprising a substantially circular ring surrounding the display and mounted for rotational movement about an axis passing substantially through the center of the ring and substantially perpendicular to the plane of the ring; and comprising a mechanism to detect clockwise and anti-clockwise rotation of the circular ring, wherein the processor means is responsive to movement of the ring to control the transceiver and the display.

8. A radio communication device, sized for attachment to a wrist, comprising:

a transceiver means for transmitting and receiving radio signals comprising data, a display for displaying data, processor means including a memory for controlling the transceiver means and the display user input means, connected to the processor means, comprising a substantially circular ring surrounding the display and mounted for rotational movement about an axis passing substantially through the center of the ring and substantially perpendicular to the plane of the ring, wherein the processor means is responsive to movement of the ring to control the transceiver and the display and whereby the electro-optical conversion mechanism is an infrared diode and an infrared detector placed below the ring Band the ring comprises light reflecting and non-light reflecting regions at its backside.

* * * * *